United States Patent
Naito et al.

(10) Patent No.: US 11,267,991 B2
(45) Date of Patent: Mar. 8, 2022

(54) TRANSPARENT ADHESIVE OPTICAL SHEET, LAMINATE AND BONDED STRUCTURE

(71) Applicant: BANDO CHEMICAL INDUSTRIES, LTD., Hyogo (JP)

(72) Inventors: Hiroki Naito, Hyogo (JP); Daisuke Takagi, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 134 days.

(21) Appl. No.: 16/635,562

(22) PCT Filed: Jul. 11, 2018

(86) PCT No.: PCT/JP2018/026156
§ 371 (c)(1),
(2) Date: Jan. 31, 2020

(87) PCT Pub. No.: WO2019/026577
PCT Pub. Date: Feb. 7, 2019

(65) Prior Publication Data
US 2020/0239738 A1 Jul. 30, 2020

(30) Foreign Application Priority Data
Aug. 2, 2017 (JP) .............................. JP2017-150276

(51) Int. Cl.
| | |
|---|---|
| *C09J 7/10* | (2018.01) |
| *C09J 7/38* | (2018.01) |
| *B32B 7/022* | (2019.01) |
| *B32B 7/12* | (2006.01) |
| *B32B 27/08* | (2006.01) |
| *B32B 27/30* | (2006.01) |
| *B32B 27/40* | (2006.01) |

(52) U.S. Cl.
CPC ................ *C09J 7/10* (2018.01); *B32B 7/022* (2019.01); *B32B 7/12* (2013.01); *B32B 27/08* (2013.01); *B32B 27/308* (2013.01); *B32B 27/40* (2013.01); *C09J 7/38* (2018.01); *C09J 7/385* (2018.01); *B32B 2307/412* (2013.01); *B32B 2315/08* (2013.01); *B32B 2333/04* (2013.01); *B32B 2375/00* (2013.01); *B32B 2405/00* (2013.01); *C09J 2433/00* (2013.01); *C09J 2475/00* (2013.01); *Y10T 428/1476* (2015.01); *Y10T 428/2848* (2015.01); *Y10T 428/2891* (2015.01); *Y10T 428/2896* (2015.01)

(58) Field of Classification Search
None
See application file for complete search history.

(56) References Cited

U.S. PATENT DOCUMENTS

| | | | |
|---|---|---|---|
| 2012/0156456 A1* | 6/2012 | Niimi | ................... C09J 133/10 428/214 |
| 2012/0328890 A1 | 12/2012 | Niimi et al. | |
| 2017/0121564 A1 | 5/2017 | Cho et al. | |
| 2018/0112112 A1* | 4/2018 | Onishi | ................ C09J 7/40 |
| 2020/0224068 A1* | 7/2020 | Takagi | .............. C09J 175/04 |

FOREIGN PATENT DOCUMENTS

| | | |
|---|---|---|
| CN | 102667895 | 9/2012 |
| EP | 2559746 | 2/2013 |
| EP | 3093832 | 11/2016 |
| JP | H06346032 | 12/1994 |
| JP | 2007119562 | 5/2007 |
| JP | 2012184390 | 9/2012 |
| JP | 2013018832 | 1/2013 |
| JP | 2013186216 | 9/2013 |
| JP | 2014214198 | 11/2014 |
| JP | 2015224320 | 12/2015 |
| JP | 2016040378 | 3/2016 |
| JP | 2016074750 | 5/2016 |
| JP | 2016108384 | 6/2016 |
| JP | 2016160408 | 9/2016 |
| JP | 2017075281 | 4/2017 |
| JP | 2017082169 | 5/2017 |
| KR | 20170051707 | 5/2017 |
| WO | 2011129200 | 10/2011 |
| WO | 2012032995 | 3/2012 |

OTHER PUBLICATIONS

"International Search Report (Form PCT/ISA/210) of PCT/JP2018/026156," dated Oct. 2, 2018, with English translation thereof, pp. 1-4.

\* cited by examiner

*Primary Examiner* — Anish P Desai
(74) *Attorney, Agent, or Firm* — JCIPRNET

(57) ABSTRACT

The present invention provides an optically clear adhesive sheet that has excellent flexibility and prevents delay bubbles in high temperature and high humidity environments. The optically clear adhesive sheet of the present invention sequentially includes a first surface-adhesive layer, an intermediate adhesive layer, and a second surface-adhesive layer. The first surface-adhesive layer and the second surface-adhesive layer each have a higher storage elastic modulus at 85° C. than the intermediate adhesive layer. The first surface-adhesive layer and the second surface-adhesive layer each have a storage elastic modulus at 85° C. of $3.0 \times 10^4$ Pa or higher and $30.0 \times 10^4$ Pa or lower. The intermediate adhesive layer has a storage elastic modulus at 85° C. of $1.0 \times 10^4$ Pa or higher and $15.0 \times 10^4$ Pa or lower. The intermediate adhesive layer contains polyurethane.

19 Claims, 2 Drawing Sheets

TRANSPARENT ADHESIVE OPTICAL SHEET, LAMINATE AND BONDED STRUCTURE

CROSS-REFERENCE TO RELATED APPLICATION

This application is a 371 application of the international PCT application serial no. PCT/JP2018/026156, filed on Jul. 11, 2018, which claims the priority benefits of Japan application no.2017-150276, filed on Aug. 2, 2017. The entirety of each of the above-mentioned patent applications is hereby incorporated by reference herein and made a part of this specification.

TECHNICAL FIELD

The present invention rerates to an optically clear adhesive sheet, a laminate including the optically clear adhesive sheet, and a bonded structure including the optically clear adhesive sheet.

BACKGROUND ART

Optically clear adhesive (OCA) sheets are transparent adhesive sheets used to bond optical members to each other. A recent rapid increase in demand for touchscreens in the fields of smartphones, tablet PCs, handheld game consoles, and automotive navigation systems is accompanied by an increase in demand for OCA sheets used to bond a touchscreen to another optical member. A typical display device with a touchscreen has a stacking structure of optical members including a display panel (e.g., liquid crystal panel), a transparent member (touchscreen main unit) having on its outer surface a transparent conductive film formed of a material such as indium tin oxide (ITO), and a cover panel that protects the transparent conductive film, with OCA sheets used to bond these optical members to each other. In between the display panel and the touchscreen main unit, however, is arranged typically an air layer called an air gap with no OCA sheet because there is a gap larger than gaps between the other optical members due to the edge of a bezel which is the housing of the display panel.

Known OCA sheets include those formed of a silicone resin composition or an acrylic resin composition, for example. However, OCA sheets formed of silicone resin have low adhesive strength and thus unfortunately allow air to enter a gap between optical members. This may cause problems such as deterioration of the display screen visibility. In the case where the acrylic resin composition is a UV-curable resin composition, when UV light is applied to the acrylic resin, free radicals needed for the reaction are consumed in the outer surface part of the acrylic resin, whereby the bottom part thereof is left uncured. It is thus difficult to provide a thick OCA sheet.

Meanwhile, multi-layer OCA sheets have been recently studied which includes multiple layers with different properties such as physical properties and different compositions. For example, Patent Literature 1 discloses a transparent double-sided self-adhesive sheet containing one or more (meth)acrylic acid ester (co)polymers as a base resin, the sheet having an indentation hardness within a prescribed range, and having a creep within a prescribed range. Preferably, the transparent double-sided self-adhesive sheet includes two or more layers. The layers have non-identical viscoelastic behaviors. Each layer contains one or more (meth)acrylic acid ester (co)polymers as a base resin. The shear storage elastic modulus at a frequency of 1 Hz of the intermediate layer (G' (A)) is higher than the shear storage elastic modulus of any one of the surface layers (G' (B)) in the entire temperature range of 0° C. to 100° C. The indentation hardness of the entire sheet is within a prescribed range.

Patent Literature 2 discloses an adhesive sheet that is a laminate including an adhesive layer (A) and an adhesive layer (B). The storage elastic modulus at a temperature of 40° C. and a frequency of 1.0 Hz of the adhesive layer (A) ($G'_{a40}$) is $1.0 \times 10^4$ Pa or higher, and the storage elastic modulus at a temperature of 70° C. and a frequency of 1 Hz of the adhesive layer (A) ($G'_{a70}$) is lower than $1.0 \times 10^4$ Pa. The storage elastic modulus at a temperature of 40° C. and a frequency of 1.0 Hz of the adhesive layer (B) ($G'_{b40}$) is $1.0 \times 10^4$ Pa or higher, and the storage elastic modulus at a temperature of 70° C. and a frequency of 1 Hz of the adhesive layer (B) ($G'_{b70}$) is $1.0 \times 10^4$ Pa or higher.

REFERENCE LIST

Patent Literature

Patent Literature 1: WO 2011/129200
Patent Literature 2: JP 2015-224320 A

SUMMARY

Technical Problem

An air gap, which is an air layer, formed between optical members causes interfacial reflection because there are differences in refractive index between the air layer and the optical members. Such interfacial reflection deteriorates visibility of the display panel. This disadvantage has led to a demand for a thick OCA sheet suited to bonding of a display panel and a touchscreen main unit. Also, an OCA sheet used to bond a display panel and a touchscreen main unit is required to conform to an uneven surface formed due to the thickness of the bezel. Accordingly, an OCA sheet has been desired which exhibits capability to conform to uneven surfaces and can be made thick. Furthermore, display devices including OCA sheets are assumed to be used in various environments, which leads to a demand for a stable quality in high temperature and high humidity environments as well as normal temperature and normal humidity environments.

The present inventors made a study on the qualities of OCA sheets to find that when an OCA sheet bonded to a substrate is left in a high temperature and high humidity environment, air bubbles (delay bubbles) may be generated between the OCA sheet and the substrate to reduce the adhesive strength. Furthermore, when an OCA sheet is used for bonding substrates that show different elasticities under environmental changes, such as a glass substrate and a resin substrate, the OCA sheet may fail to follow the size difference between the substrates to peel off. The inventors made a further study to find that when the storage elastic modulus of an OCA sheet is reduced in order to improve the flexibility enabling conforming to uneven surfaces (capability to conform to uneven surfaces) and the flexibility enabling following the size difference between substrates (elasticity followability), delay bubbles tend to be generated. Meanwhile, when the storage elastic modulus of an OCA sheet is increased to provide a rigid OCA sheet in order to prevent delay bubbles, the capability to conform to uneven surfaces and the elasticity followability may be reduced. Thereby, the OCA sheet may be less likely to absorb strain caused by different elasticities between the substrates, resulting in peeling of the OCA sheet from the substrates.

The present invention has been made under the current situation in the art and aims to provide an optically clear adhesive sheet that has excellent flexibility and prevents delay bubbles in high temperature and high humidity environments, a laminate including the optically clear adhesive sheet, and a bonded structure including the optically clear adhesive sheet.

Solution to Problem

The inventors made a study on an optically clear adhesive sheet that can maintain stable quality in high temperature and high humidity environments and focused on allowing an optically clear adhesive sheet to have a multi-layer structure in order to achieve both of the conflicting matters, i.e., improvement of flexibility and prevention of delay bubbles. The inventors made a further study to find the following. That is, using an adhesive layer having a low storage elastic modulus and high flexibility as an intermediate adhesive layer and disposing a rigid surface-adhesive layer having a high storage elastic modulus on each side of the intermediate adhesive layer allow the resulting optically clear adhesive sheet to have excellent flexibility and adhesiveness to substrates and to prevent delay bubbles in high temperature and high humidity environments. Thus, the inventors completed the present invention.

The optically clear adhesive sheet of the present invention is an optically clear adhesive sheet sequentially including: a first surface-adhesive layer; an intermediate adhesive layer; and a second surface-adhesive layer, the first surface-adhesive layer and the second surface-adhesive layer each having a higher storage elastic modulus at 85° C. than the intermediate adhesive layer, the first surface-adhesive layer and the second surface-adhesive layer each having a storage elastic modulus at 85° C. of $3.0 \times 10^4$ Pa or higher and $30.0 \times 10^4$ Pa or lower, the intermediate adhesive layer having a storage elastic modulus at 85° C. of $1.0 \times 10^4$ Pa or higher and $15.0 \times 10^4$ Pa or lower, the intermediate adhesive layer containing polyurethane.

The first surface-adhesive layer and the second surface-adhesive layer preferably each have a higher storage elastic modulus at 30° C. than the intermediate adhesive layer.

The first surface-adhesive layer and the second surface-adhesive layer preferably each have a lower loss tangent at 30° C. than the intermediate adhesive layer.

The first surface-adhesive layer and the second surface-adhesive layer preferably each have a lower loss tangent at 85° C. than the intermediate adhesive layer.

The first surface-adhesive layer and the second surface-adhesive layer preferably each have a loss tangent at 85° C. of 0.54 or lower.

The intermediate adhesive layer preferably has a greater thickness than each of the first surface-adhesive layer and the second surface-adhesive layer.

The first surface-adhesive layer and the second surface-adhesive layer preferably each contain polyurethane or acrylic resin.

The intermediate adhesive layer preferably contains cured thermosetting polyurethane.

The laminate of the present invention is a laminate including: the optically clear adhesive sheet of the present invention; a first release liner covering one surface of the optically clear adhesive sheet; and a second release liner covering the other surface of the optically clear adhesive sheet.

The bonded structure of the present invention is a bonded structure including: a first adherend including a glass substrate; a second adherend including a resin substrate; and the optically clear adhesive sheet of the present invention bonding the glass substrate and the resin substrate.

Advantageous Effects of Invention

The present invention can provide an optically clear adhesive sheet that has excellent flexibility and prevents delay bubbles in high temperature and high humidity environments. The present invention can provide a laminate that can improve the handleability of an optically clear adhesive sheet of the present invention. The present invention can provide a bonded structure that is less likely to cause peeling in high temperature and high humidity environments and prevents delay bubbles in high temperature and high humidity environments.

DESCRIPTION OF THE EMBODIMENTS

[Optically Clear Adhesive Sheet]

The optically clear adhesive sheet of the present invention sequentially includes a first surface-adhesive layer, an intermediate adhesive layer, and a second surface-adhesive layer. The first surface-adhesive layer and the second surface-adhesive layer each have a higher storage elastic modulus at 85° C. than the intermediate adhesive layer. The first surface-adhesive layer and the second surface-adhesive layer each have a storage elastic modulus at 85° C. of $3.0 \times 10^4$ Pa or higher and $30.0 \times 10^4$ Pa or lower. The intermediate adhesive layer has a storage elastic modulus at 85° C. of $1.0 \times 10^4$ Pa or higher and $15.0 \times 10^4$ Pa or lower. The intermediate adhesive layer contains polyurethane.

Figure 1:
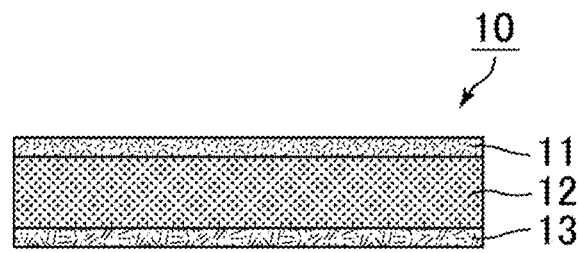
FIG. 1 is a schematic cross-sectional view of an exemplary optically clear adhesive sheet of the present invention.

FIG. 1 is a schematic cross-sectional view of an exemplary optically clear adhesive sheet of the present invention. As shown in FIG. 1, an optically clear adhesive sheet 10 of the present invention sequentially includes a first surface-adhesive layer 11, an intermediate adhesive layer 12, and a second surface-adhesive layer 13.

<Surface-Adhesive Layer>

The first surface-adhesive layer 11 and the second surface-adhesive layer 13 each have a higher storage elastic modulus at 85° C. than the intermediate adhesive layer 12. An adhesive layer having a low storage elastic modulus (having a low crosslinking density and being soft) has excellent flexibility but has low adhesiveness to substrates. When such an adhesive layer is used in a single layer structure, partial detachment or peeling may be caused at an interface with a substrate. When the storage elastic modulus is reduced, delay bubbles tend to be generated in high temperature and high humidity environments. In order to overcome these disadvantages, an adhesive layer having a low storage elastic modulus is used as the intermediate adhesive layer 12 and a surface-adhesive layer having a high storage elastic modulus (having a high crosslinking density and being rigid) is disposed on each side of the intermediate adhesive layer 12. This structure can achieve both excellent flexibility and adhesiveness to the substrates and prevent delay bubbles in high temperature and high humidity environments. The storage elastic modulus can be measured using a viscoelasticity measuring device "Physica MCR301" available from Anton Paar Germany GmbH. The measuring plate is PP12, and the measuring conditions are a strain of 0.1%, a frequency of 1 Hz and a cell temperature of 25° C. to 100° C. (temperature rise rate: 3° C./min). The measured value at the target temperature can be taken as the storage elastic modulus.

The first surface-adhesive layer 11 and the second surface-adhesive layer 13 each have a storage elastic modulus at 85° C. ($G'_{85°\ C.}$) of $3.0 \times 10^4$ Pa or higher and $30.0 \times 10^4$ Pa or lower. When the first and second surface-adhesive layers each have a $G'_{85°\ C.}$ of lower than $3.0 \times 10^4$ Pa, the first and second surface-adhesive layers are too soft to prevent inner foaming of the intermediate adhesive layer. When such a surface-adhesive layer is bonded to a resin substrate, the surface-adhesive layer fails to sufficiently absorb moisture generated from the resin substrate, causing peeling in a heat cycle test. When the first and second surface-adhesive layers each have a $G'_{85°\ C.}$ of higher than $30.0 \times 10^4$ Pa, the first and second surface-adhesive layers are too rigid to keep the adhesiveness to substrates, whereby peeling tends to occur. In particular, when an optically clear adhesive sheet including these surface-adhesive layers is used for bonding a glass substrate and a resin substrate, peeling occurs in a heat cycle test because the difference in elasticity between the substrates is large and the optically clear adhesive sheet cannot absorb the strain caused by the substrates under environmental change. A preferred lower limit of the $G'_{85°\ C.}$ of each of the first and second surface-adhesive layers is $5.0 \times 10^4$ Pa and a preferred upper limit thereof is $25.0 \times 10^4$ Pa. More preferably, the first and second surface-adhesive layers each have a $G'_{85°\ C.}$ of higher than $15.0 \times 10^4$ Pa, and a more preferred upper limit thereof is $20.0 \times 10^4$ Pa.

The first surface-adhesive layer 11 and the second surface-adhesive layer 13 each preferably have a higher storage elastic modulus at 30° C. than the intermediate adhesive layer 12. This achieves both excellent flexibility and adhesiveness to substrates at 30° C. The first surface-adhesive layer 11 and the second surface-adhesive layer 13 may each have a storage elastic modulus at 30° C. ($G'_{30°\ C.}$) of, for example, $15.5 \times 10^4$ Pa or higher and $35.5 \times 10^4$ Pa or lower. A more preferred lower limit of the $G'_{30}° C.$ of each of the first and second surface-adhesive layers is $17.5 \times 10^4$ Pa, a more preferred upper limit thereof is $30.0 \times 10^4$ Pa, and a still more preferred lower limit is $20.0 \times 10^4$ Pa.

The first surface-adhesive layer 11 and the second surface-adhesive layer 13 each preferably have a lower loss tangent at 85° C. than the intermediate adhesive layer 12. Disposing a rigid surface-adhesive layer having a high storage elastic modulus on each side of the intermediate adhesive layer 12 having high flexibility can achieve both excellent flexibility and adhesiveness to substrates and prevent delay bubbles.

The first surface-adhesive layer 11 and the second surface-adhesive layer 13 each have a loss tangent (tan $\delta_{85°\ C.}$) of preferably 0.54 or lower. When the first and second surface-adhesive layers each have a (tan $\delta_{85°\ C.}$) of higher than 0.54, the first and second surface-adhesive layers may be too soft to prevent inner foaming of the intermediate adhesive layer. When such a surface-adhesive layer is bonded to a resin substrate, the surface-adhesive layer fails to sufficiently absorb moisture generated from the resin substrate, possibly causing peeling in a heat cycle test. The lower limit of tan $\delta_{85°\ C.}$ of the first and second surface-adhesive layers is 0.1, for example. A more preferred upper limit of tan $\delta_{85°\ C.}$ of the first and second surface-adhesive layers is 0.5, and a more preferred lower limit thereof is 0.2. The loss tangent may be measured at the same conditions and using the same device as for measuring the storage elastic modulus. The measuring value at the target temperature can be taken as the loss tangent.

The first surface-adhesive layer 11 and the second surface-adhesive layer 13 each preferably have a lower loss tangent at 30° C. than the intermediate adhesive layer 12. This achieves both excellent flexibility and adhesiveness to substrates at 30° C. The first surface-adhesive layer 11 and the second surface-adhesive layer 13 each have a loss tangent at 30° C. (tan $\delta_{30°\ C.}$) of preferably 0.7 or lower, more preferably 0.6 or lower, still more preferably 0.54 or lower.

The first surface-adhesive layer 11 and the second surface-adhesive layer 13 may have the same or different $G'_{85°\ C.}$, $G'_{30°\ C.}$, tan $\delta_{85°\ C.}$, and tan $\delta_{30°\ C.}$ values.

The first surface-adhesive layer 11 and the second surface-adhesive layer 13 preferably contain polyurethane or acrylic resin. The first surface-adhesive layer 11 and the second surface-adhesive layer 13 containing polyurethane or acrylic resin can achieve excellent transparency. The first surface-adhesive layer 11 and the second surface-adhesive layer 13 may both contain polyurethane or may both contain acrylic resin. One of the first surface-adhesive layer 11 and the second surface-adhesive layer 13 may contain polyurethane and the other may contain acrylic resin.

The polyurethane is a cured product of a polyurethane composition. Examples of the polyurethane composition include a thermosetting polyurethane composition. The thermosetting polyurethane composition may be the same as the later-described thermosetting polyurethane composition used for the intermediate adhesive layer 12.

The acrylic resin is a cured product of an acrylic resin composition. Examples of the acrylic resin composition include a composition containing a crosslinking agent and a (meth)acrylic ester-based polymer or a copolymer of a (meth)acrylic acid alkyl ester and a monomer (hereinafter, also referred to as a (meth)acrylic copolymer).

Examples of the (meth)acrylic copolymer include a copolymer of a (meth)acrylic acid alkyl ester and a carboxyl-group-containing monomer.

Examples of the (meth)acrylic acid alkyl ester include a (meth)acrylic acid alkyl ester containing a C1-C18 alkyl group ($CH_2=CR^1-COOR^2$, wherein $R^1$ represents a hydrogen atom or a methyl group and $R^2$ represents a C1-C18 alkyl group). The carbon number of the alkyl group is more preferably 4 to 12.

Examples of the (meth)acrylic acid alkyl ester containing a C1-C18 alkyl group include methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, decyl (meth)acrylate, isodecyl (meth)acrylate, undeca (meth)acrylate, lauryl (meth)acrylate, stearyl (meth)acrylate, and isostearyl (meth)acrylate. These may be used alone or in combination of two or more.

Examples of the carboxyl-group-containing monomer include carboxyl-group-containing (meth)acrylates such as β-carboxy ethyl (meth)acrylate, 5-carboxy pentyl (meth) acrylate, mono(meth)acryloyl oxyethyl succinate, and ω-carboxy polycaprolactone mono(meth)acrylate; and acrylic acid, methacrylic acid, itaconic acid, crotonic acid, fumaric acid, and maleic acid. These may be used alone or in combination of two or more.

The crosslinking agent may be any component that can cause a crosslinking reaction with a crosslinkable functional group derived from a crosslinkable-functional-group-containing monomer contained in the (meth)acrylic copolymer. Examples thereof include an isocyanate compound, a metal chelate compound, and an epoxidized compound. These crosslinking agents may be used alone or in combination of two or more.

The first surface-adhesive layer 11 and the second surface-adhesive layer 13 each have a thickness of preferably 10 μm to 500 μm. A surface-adhesive layer having a thickness of less than 10 μm may fail to sufficiently prevent inner foaming of the intermediate adhesive layer 12. A surface-adhesive layer having a thickness of more than 500 μm increases the cost but does not achieve any better effect of preventing inner foaming. Thus, the surface-adhesive layers each have a thickness of preferably 500 μm or less. A more preferred lower limit of the thickness is 20 μm, and a more preferred upper limit thereof is 300 μm. The first surface-adhesive layer 11 and the second surface-adhesive layer 13 may have the same thickness or different thicknesses.

The first surface-adhesive layer 11 and the second surface-adhesive layer 13 each have an adhesive strength to glass at 85° C. of preferably 1 N/25 mm or more. The adhesive strength at 85° C. means an adhesive strength measured in a 180° peeling test. The 180° peeling test is specifically described later. When the first and second surface-adhesive layers each have an adhesive strength to glass at 85° C. of 1 N/25 mm or more, the optically clear adhesive sheet of the present invention can keep sufficient adhesion to an adherend including a glass substrate in high temperature environments. The upper limit of the adhesive strength at 85° C. is not limited but is 15 N/25 mm, for example. A surface-adhesive layer having an adhesive strength of 15 N/25 mm or less, both at 85° C. and at a normal temperature and a normal humidity as described below, can be peeled off without adhesive residue when used to bond an optical member such as a touchscreen to another optical member, exhibiting excellent reworkability. If the adhesive strength of the optically clear adhesive sheet is very high, it may be difficult to remove air bubbles present between the optically clear adhesive sheet and the adherend. The adhesive strength at 85° C. is more preferably 4 N/25 mm or more, still more preferably 10 N/25 mm or more.

The first surface-adhesive layer 11 and the second surface-adhesive layer 13 each have an adhesive strength to glass at a normal temperature and a normal humidity of preferably 2 N/25 mm or more. The adhesive strength at a normal temperature and a normal humidity means the adhesive strength measured in a 180° peeling test. The upper limit of the adhesive strength at a normal temperature and a normal humidity is not limited but is 15 N/25 mm or less, for example. The adhesive strength at a normal temperature and a normal humidity is more preferably 5 N/25 mm or more, still more preferably 10 N/25 mm or more.

Figure 4:
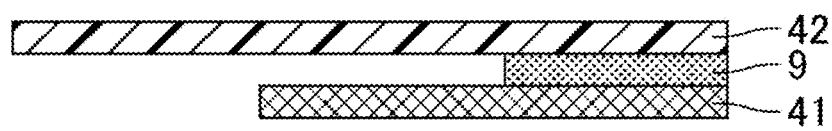
FIG. 4 shows schematic views for describing a method for evaluating an adhesive strength.
Figure 4:
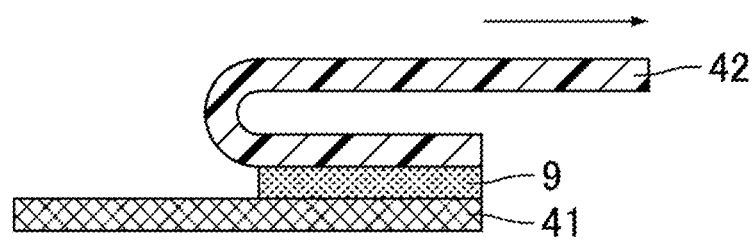

FIG. 4 shows schematic views for describing a method for evaluating the adhesive strength. The 180° peeling test is conducted as follows. For example, an adhesive sheet 9 cut into a size of 75 mm (length)×25 mm (width) is used as a sample. One surface of the sample is bonded to a microscope slide 41 having a size of 75 mm (length)×25 mm (width). The members are retained in this state under a pressure of 0.4 MPa for 30 minutes, so that the adhesive sheet 9 and the microscope slide 41 are bonded to each other. Then, a PET sheet 42 is bonded to the surface of the adhesive sheet 9 on the side opposite to the microscope slide 41 as shown in (a) of FIG. 4. The sample is then left to stand at a prescribed temperature for a prescribed period of time. The adhesive strength of the adhesive sheet 9 to the microscope slide 41 is measured by pulling the PET sheet 42 in a 180° direction as shown in (b) of FIG. 4 such that the adhesive sheet 9 is separated from the microscope slide 41 at the interface therebetween. Examples of the PET sheet include a 125-μm-thick PET sheet ("Melinex® S" available from Teijin DuPont Films).

<Intermediate Adhesive Layer>

The intermediate adhesive layer 12 has a storage elastic modulus at 85° C. ($G'_{85° C.}$) of $1.0 \times 10^4$ Pa or higher and $15.0 \times 10^4$ Pa or lower. An intermediate adhesive layer 12 having a $G'_{85° C.}$ of less than $1.0 \times 10^4$ Pa is too soft and thus tends to cause inner foaming and peeling in a heat cycle test. An intermediate adhesive layer 12 having a $G'_{85° C.}$ of more than $15.0 \times 10^4$ Pa has too low a flexibility and thus fails to achieve sufficient capability to conform to uneven surfaces. In addition, when the optically clear adhesive sheet 10 is used for bonding substrates that show different elasticities under environmental changes, the optically clear adhesive sheet 10 fails to follow the size difference between the substrates to peel off. A preferred lower limit of the $G'_{85° C.}$ of the intermediate adhesive layer 12 is $2.0 \times 10^4$ Pa, a preferred upper limit thereof is $14.0 \times 10^4$ Pa.

The intermediate adhesive layer 12 may have a storage elastic modulus at 30° C. ($G'_{30° C.}$) of, for example, $8.0 \times 10^4$ Pa or higher and $33.0 \times 10^4$ Pa or lower. A more preferred lower limit of the $G'_{30° C.}$ of the intermediate adhesive layer 12 is $12.0 \times 10^4$ Pa, and a more preferred upper limit thereof is $25.0 \times 10^4$ Pa. Still more preferably, the intermediate adhesive layer 12 has a $G'_{30° C.}$ of lower than $20.0 \times 10^4$ Pa.

The intermediate adhesive layer 12 may have a loss tangent at 85° C. ($\tan \delta_{85° C.}$) of, for example, 0.2 or more and 0.8 or less. A more preferred lower limit of the $\tan \delta_{85° C.}$ of the intermediate adhesive layer 12 is higher than 0.54, and a more preferred upper limit thereof is 0.7.

The intermediate adhesive layer 12 may have a loss tangent at 30° C. ($\tan \delta_{30° C.}$) of 0.3 or more and 0.85 or less, for example. A more preferred lower limit of the $\tan \delta_{30° C.}$ of the intermediate adhesive layer 12 is 0.35, and a more preferred upper limit thereof is 0.6. Still more preferably, the intermediate adhesive layer 12 has a $\tan \delta_{30° C.}$ of more than 0.54.

The intermediate adhesive layer 12 is preferably thicker than each of the first surface-adhesive layer 11 and the second surface-adhesive layer 13. A thick intermediate adhesive layer 12 having high flexibility can improve the capability to conform to uneven surfaces and the elasticity followability of the optically clear adhesive sheet 10.

The intermediate adhesive layer 12 has a thickness of preferably 100 μm to 2000 μm. An intermediate adhesive layer 12 having a thickness of less than 100 μm may reduce the flexibility of the entire optically clear adhesive sheet. Thus, when one surface of the optically clear adhesive sheet is bonded to a surface of an optical member, the optically clear adhesive sheet may fail to conform to the roughness or unevenness on the surface of the optical member. This may prevent the other surface of the optically clear adhesive sheet from bonding to a surface of another optical member with sufficient adhesiveness. An intermediate adhesive layer 12 having a thickness of more than 2000 μm may fail to have sufficient optical characteristics such as a haze or a total light transmittance. A more preferred lower limit of the thickness of the intermediate adhesive layer 12 is 150 μm, a still more preferred lower limit thereof is 200 μm, and a particularly preferably lower limit thereof is 250 μm. A more preferred upper limit of the thickness of the intermediate adhesive layer 12 is 1500 μm, and a still more preferred upper limit thereof is 1000 μm.

The first surface-adhesive layer 11, the intermediate adhesive layer 12, and the second surface-adhesive layer 13 each preferably have a haze of 1% or lower and a total light transmittance of 90% or higher in order to ensure the characteristics as an optically clear adhesive sheet. The haze and the total light transmittance herein can each be measured with, for example, a turbidity meter "Haze Meter NDH2000" available from Nippon Denshoku Industries Co., Ltd. The haze is measured by a process in accordance with JIS K 7136, and the total light transmittance is measured by a process in accordance with JIS K 7361-1.

The intermediate adhesive layer 12 contains polyurethane. Since the intermediate adhesive layer 12 contains polyurethane and has flexibility, the optically clear adhesive sheet of the present invention is elongated well and very unlikely to be torn under tensile stress. The optically clear adhesive sheet can therefore be peeled off without adhesive residue. Since the intermediate adhesive layer 12 contains polyurethane, the optically clear adhesive sheet of the present invention has a high dielectric constant and can give a higher capacitance than conventional optically clear adhesive sheets formed of an acrylic resin composition. The optically clear adhesive sheet of the present invention is therefore suitable for bonding of a capacitive touchscreen. Furthermore, the presence of polyurethane in the intermediate adhesive layer 12 allows the optically clear adhesive sheet to have excellent transparency and to avoid whitening in high temperature and high humidity environments.

The intermediate adhesive layer 12 preferably contains cured thermosetting polyurethane. The cured thermosetting polyurethane may have a film form without a solvent. Thus, the presence of cured thermosetting polyurethane in the intermediate adhesive layer 12 enables to provide a thick intermediate adhesive layer 12. Even when the intermediate adhesive layer 12 has a large thickness, the presence of the cured thermosetting polyurethane enables to provide a highly reliable optically clear adhesive sheet that has excellent flexibility and excellent transparency and is less likely to cause whitening in high temperature and high humidity environments.

The cured thermosetting polyurethane is a cured product of a thermosetting polyurethane composition. The thermosetting polyurethane composition preferably contains a polyol component and a polyisocyanate component. The cured thermosetting polyurethane is obtainable by reacting the polyol component and the polyisocyanate component, for example, and preferably has a structure represented by the following formula (A).

[Chem. 1]

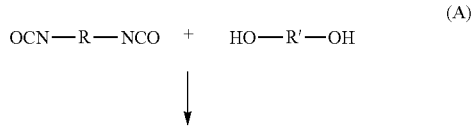

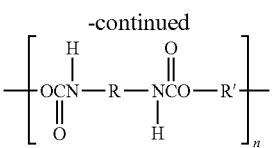

In the formula (A), R represents a non-NCO-group moiety of a polyisocyanate component, R' represents a non-OH-group moiety of a polyol component, and n represents the number of repeating units.

The cured thermosetting polyurethane is preferably not an acrylic-modified one, and preferably contains no moiety derived from, for example, an acrylic ester or a methacrylic ester in the main chain. An acrylic-modified cured thermosetting polyurethane is hydrophobic and is thus likely to cause moisture condensation in high temperature and high humidity environment. The moisture condensation may cause defects such as whitening and foaming to damage the optical characteristics. A non-acrylic-modified cured thermosetting polyurethane can prevent deterioration of the optical characteristics due to defects such as whitening and foaming in high temperature and high humidity environments. The cured thermosetting polyurethane preferably contains a total of 80 mol % or more of monomer units derived from a polyol component and monomer units derived from a polyisocyanate component relative to all the monomer units constituting the cured thermosetting polyurethane. More preferably, the cured thermosetting polyurethane consists only of monomer units derived from a polyol component and monomer units derived from a polyisocyanate component.

Both the polyol component and the polyisocyanate component can be components that are liquids at normal temperature (23° C.), so that cured thermosetting polyurethane can be obtained without a solvent. Other components such as a tackifier can be added to the polyol component or the polyisocyanate component, and are preferably added to the polyol component. Production of the intermediate adhesive layer 12 using cured thermosetting polyurethane, which eliminates the need for removing a solvent, enables formation of a thick sheet, i.e., a thick intermediate adhesive layer 12 with a uniform thickness. The optically clear adhesive sheet including the intermediate adhesive layer 12, when used to bond a display panel and a transparent member (touchscreen) having on its outer surface a transparent conductive film, can therefore conform to an uneven surface formed due to the thickness of the bezel. Also, the intermediate adhesive layer 12 can keep its optical characteristics even in the case of having a large thickness, and thus can sufficiently prevent transparency decrease (haze increase), coloring, and foaming (generation of air bubbles at the interface with an adherend). Furthermore, since the intermediate adhesive layer 12 may have a large thickness while being flexible, the intermediate adhesive layer 12 is excellent in shock resistance. Thus, an optically clear adhesive sheet including the intermediate adhesive layer 12 can be used to bond a transparent member having a transparent conductive film on its outer surface to a cover panel. In the case of using an additional member, the optically clear adhesive sheet can also be used to bond the display panel or the transparent member having a transparent conductive film on its outer surface to the additional member.

[Polyol Component]

The polyol component preferably has an olefin skeleton. That is, its main chain preferably includes a polyolefin or a derivative thereof. Examples of the polyol component having an olefin skeleton include polybutadiene-based polyols such as 1,2-polybutadiene polyol, 1,4-polybutadiene polyol, 1,2-polychloroprene polyol, and 1,4-polychloroprene polyol, polyisoprene-based polyols, and saturated compounds obtained by adding hydrogen or halogen atoms to the double bonds of these polyols. The polyol component may be a polyol obtained by copolymerizing a polybutadiene-based polyol, for example, with an olefin compound, such as styrene, ethylene, vinyl acetate, or acrylic ester, or a hydrogenated compound thereof. The polyol component may have a linear or branched structure. One of the polyol components may be used alone or two or more thereof may be used in combination. The polyol component preferably includes 80 mol % or more of a polyol component having an olefin skeleton, and more preferably consists only of a polyol component having an olefin skeleton.

[Polyisocyanate Component]

The polyisocyanate component is preferably a modified polyisocyanate obtained by, for example, reacting an acyclic aliphatic and/or alicyclic polyisocyanate containing an isocyanate group with an ether compound having an ethylene oxide unit. An acyclic aliphatic and/or alicyclic polyisocyanate can reduce the chances of coloring or discoloration and enables the optically clear adhesive sheet to exhibit long-lasting transparency with higher reliability. Also, being modified with an ether compound having an ethylene oxide unit, the polyisocyanate component can prevent whitening owing to its hydrophilic moiety (ethylene oxide unit) and can exhibit miscibility with low-polarity components such as a tackifier and a plasticizer owing to its hydrophobic moiety (the other units).

The thermosetting polyurethane composition preferably has an $\alpha$ ratio (the number of moles of OH groups derived from polyol component/the number of moles of NCO groups derived from polyisocyanate component) of 1 or higher. An $\alpha$ ratio of lower than 1 suggests that the amount of the polyisocyanate component is excessive for the amount of the polyol component and thus the cured thermosetting polyurethane may be rigid, which makes it difficult to achieve the flexibility required for the optically clear adhesive sheet. With a low flexibility of the intermediate adhesive layer constituting the optically clear adhesive sheet, the optically clear adhesive sheet cannot conform to a rough and uneven bonding surface of an adherend, especially an optical member such as a touchscreen. Also, the adhesive strength required for the optically clear adhesive sheet may not be achieved. The $\alpha$ ratio more preferably satisfies the inequality $1<\alpha<2.0$. If the $\alpha$ ratio is 2.0 or higher, the thermosetting polyurethane composition may not be sufficiently cured.

[Tackifier]

The thermosetting polyurethane composition may further contain a tackifier (adhesion-imparting agent). A tackifier is an additive that is added to enhance the adhesive strength, is typically an amorphous oligomer having a molecular weight of several hundreds to several thousands, and is a thermoplastic resin in a liquid or solid state at normal temperature. A thermosetting polyurethane composition containing a tackifier can increase the adhesive strength on each side of the intermediate adhesive layer 12 containing a cured product of the thermosetting polyurethane (cured thermosetting polyurethane).

[Plasticizer]

The thermosetting polyurethane composition may further contain a plasticizer. The plasticizer may be any compound that is used to impart flexibility to a cured product of the thermosetting polyurethane, and preferably contains a carboxylic acid-based plasticizer in terms of miscibility and weather resistance.

[Catalyst]

The thermosetting polyurethane composition may further contain a catalyst. The catalyst may be any catalyst that is used in a urethane modification reaction. Examples thereof include organotin compounds such as di-n-butyltin dilaurate, dimethyltin dilaurate, dibutyltin oxide, and tin octanoate; organotitanium compounds; organozirconium compounds; tin carboxylates; bismuth carboxylates; and amine-based catalysts such as triethylene diamine.

The thermosetting polyurethane composition may contain, as necessary, various additives such as colorants, stabilizers, antioxidants, antifungal agents, and flame retardants as long as the characteristics required for the optically clear adhesive sheet are not damaged.

The optically clear adhesive sheet 10 sequentially includes the first surface-adhesive layer 11, the intermediate adhesive layer 12, and the second surface-adhesive layer 13, and may further include another layer. The first surface-adhesive layer 11 and the second surface-adhesive layer 13 are each located on an outermost surface (the surface to be in contact with an adherend) of the optically clear adhesive sheet 10.

<Optically Clear Adhesive Sheet>

The optically clear adhesive sheet of the present invention preferably has a haze of 1% or lower and a total light transmittance of 90% or higher in order to ensure the characteristics as an optically clear adhesive sheet. The haze and the total light transmittance can each be measured with, for example, a turbidity meter "Haze Meter NDH2000" available from Nippon Denshoku Industries Co., Ltd. The haze is measured by a process in accordance with JIS K 7136, and the total light transmittance is measured by a process in accordance with JIS K 7361-1.

The optically clear adhesive sheet of the present invention preferably has a micro rubber hardness (type A) of 0.5° or higher and 25° or lower. An optically clear adhesive sheet having a micro rubber hardness (type A) of lower than 0.5° may exhibit low handleability in use (during bonding to an optical member) and may be strained. In contrast, an optically clear adhesive sheet having a micro rubber hardness (type A) of higher than 25° may exhibit low flexibility and, during bonding to an optical member, may fail to conform to the surface shape of the optical member and allow air to enter a gap between itself and the optical member. This may eventually cause peeling of the sheet from the optical member. Also, an optically clear adhesive sheet having low flexibility may fail to conform to an uneven surface formed due to the thickness of the bezel, during bonding of an optical member such as a touchscreen to another optical member. The micro rubber hardness (type A) of the optically clear adhesive sheet is more preferably 0.5° or higher and 15° or lower. The micro rubber hardness can be measured with, for example, a micro durometer "MD-1 Type A" available from Kobunshi Keiki Co., Ltd. The micro durometer "MD-1 Type A" is a durometer designed and produced as an approximately ⅕-sized compact model of a spring type A durometer, and is capable of giving the same measurement result as a spring type A durometer even when the measuring object is thin.

The entire optically clear adhesive sheet has a thickness of preferably 120 μm or more. The upper limit of the thickness of the entire optically clear adhesive sheet is not limited but is 3000 μm, for example. The optically clear adhesive sheet preferably has a thickness at least three times greater than the height of the roughness or unevenness of the bonding surface of an adherend. A more preferred lower limit of the thickness is 200 μm, and a more preferred upper limit thereof is 2000 μm.

[Laminate]

Figure 2:
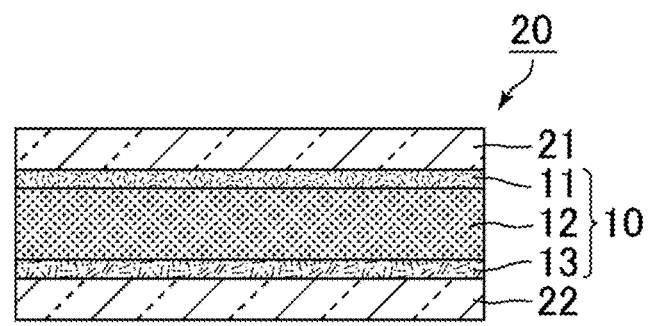
FIG. 2 is a schematic cross-sectional view of an exemplary laminate of the present invention.

The optically clear adhesive sheet of the present invention may have a release liner on each surface. FIG. 2 is a schematic cross-sectional view of an exemplary laminate of the present invention. A laminate 20 including the optically clear adhesive sheet 10 of the present invention, a first release liner 21 covering one surface of the optically clear adhesive sheet 10, and a second release liner 22 covering the other surface of the optically clear adhesive sheet 10 (hereinafter, also referred to as a "laminate of the present invention") is also one aspect of the present invention. In the laminate of the present invention, the first release liner and the second release liner can protect the both surfaces of the optically clear adhesive sheet of the present invention until immediately before being bonded to an adherend. The release liners therefore prevent deterioration of adhesion and sticking of foreign matters to the optically clear adhesive sheet of the present invention. Also, the release liners can prevent the surfaces of the optically clear adhesive sheet of the present invention from being bonded to something other than the adherend, improving the handleability of the optically clear adhesive sheet.

The first release liner and the second release liner can each be, for example, a PET film. The materials and the thicknesses of the first release liner and the second release liner may be the same as or different from each other.

The bonding strength (peel strength) between the optically clear adhesive sheet of the present invention and the first release liner and the bonding strength (peel strength) between the optically clear adhesive sheet of the present invention and the second release liner are preferably different from each other. Such a difference in bonding strength makes it easy to peel one of the first release liner and the second release liner (release liner with lower bonding strength) alone from the laminate of the present invention and bond the exposed first surface of the optically clear adhesive sheet and a first adherend to each other, followed by peeling the other of the first release liner and the second release liner (release liner with higher bonding strength) and then bonding the exposed second surface of the optically clear adhesive sheet and a second adherend to each other.

Easy-peel treatment (release treatment) may be conducted on one or both of the surface of the first release liner coming into contact with the optically clear adhesive sheet of the present invention and the surface of the second release liner coming into contact with the optically clear adhesive sheet of the present invention. Examples of the easy-peel treatment include siliconizing.

[Bonded Structure]

Application of the optically clear adhesive sheet of the present invention is not particularly limited. A bonded structure including a first adherend including a glass substrate; a second adherend including a resin substrate; and the optically clear adhesive sheet of the present invention bonding the glass substrate and the resin substrate to each other (hereinafter, also referred to as a "bonded structure of the present invention") is also one aspect of the present invention.

The first adherend includes a glass substrate. The first adherend may be any adherend as long as the surface to be bonded to the optically clear adhesive sheet is formed of a glass substrate, and examples thereof include various panels in a display device, such as a display panel, a touchscreen, and a cover panel; and glass plates. The optically clear adhesive sheet of the present invention can prevent scattering of glass when bonded to a glass substrate.

The second adherend includes a resin substrate. Examples of the material of the resin substrate include polyethylene terephthalate (PET), triacetylcellulose (TAC), and polycarbonate (PC). The second adherend may be any adherend as long as the surface to be bonded to an optically clear adhesive sheet is formed of a resin substrate, and examples thereof include various panels in a display device, such as a display panel, a touchscreen, and a cover panel; polarizing plates; and resin plates. For example, the bonding surface of a polarizing plate is formed of triacetylcellulose (TAC), and the bonding surface of a resin plate is formed of polycarbonate (PC). The optically clear adhesive sheet of the present invention can exert good adhesion to these resins as well as glass. These resin substrates exhibit a greater change in size due to temperature change than the glass substrate. For example, considering the difference in elasticity between a glass substrate and a PET film, in a 12-inch display device, the difference assumedly causes a size difference of about 1.5 mm along a diagonal of the device, and in a 50-inch display device, the difference assumedly causes a size difference of about 5.0 mm along a diagonal of the device. The optically clear adhesive sheet of the present invention includes an intermediate adhesive layer having a low storage elastic modulus and high flexibility, and thus can follow the size difference between the substrates. The optically clear adhesive sheet is less likely to cause peeling in high temperature and high humidity environments as well as in normal temperature and normal humidity environments, and is thus suitable for bonding the glass substrate and the resin substrate. The resin substrate tends to generate moisture and outgas, compared with the glass substrate. Fortunately, the optically clear adhesive sheet of the present invention, including rigid first and second surface-adhesive layers each having a high storage elastic modulus, can prevent moisture condensation and delay bubbles at an interface between a substrate and the optically clear adhesive sheet.

The optically clear adhesive sheet of the present invention may have a structure in which the glass substrate and the first surface-adhesive layer 11 are in contact with each other and the resin substrate and the second surface-adhesive layer 13 are in contact with each other, or a structure in which the glass substrate and the second surface-adhesive layer 13 are in contact with each other and the resin substrate and the first surface-adhesive layer 11 are in contact with each other.

Examples of the bonded structure of the present invention include a touchscreen display device, including the optically clear adhesive sheet of the present invention, a display panel, and a touchscreen. Bonding the panels in a display device, for example, with the optically clear adhesive sheet of the present invention can eliminate air layers (air gaps) in the display device and thereby increase the visibility of the display screen.

Figure 3:
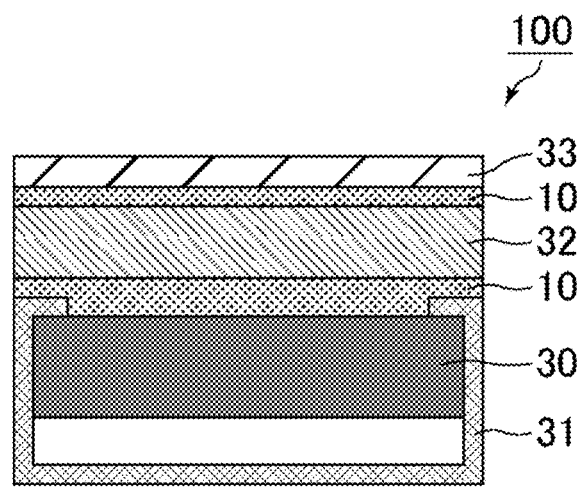
FIG. 3 is a schematic cross-sectional view of an exemplary touchscreen display device including the optically clear adhesive sheet of the present invention.

FIG. 3 shows a schematic cross-sectional view of an exemplary a touchscreen display device including the optically clear adhesive sheet of the present invention. As shown in FIG. 3, a display device 100 includes a display panel 30, an optically clear adhesive sheet 10, a touchscreen (glass substrate with an ITO transparent conductive film) 32, another optically clear adhesive sheet 10, and a transparent cover panel 33 stacked in the stated order. In FIG. 3, the three optical members, namely the display panel 30, the touchscreen 32, and the transparent cover panel 33, are integrated into one member with the two optically clear adhesive sheets 10 of the present invention.

The display panel 30 is housed in a bezel (housing for the display panel 30) 31 provided with an opening on the display surface side. The outer edge of the opening of the bezel 31 has produced the uneven surface with peaks corresponding to the thickness of the bezel 31. The optically clear adhesive sheet 10 is bonded so as to cover the display surface sides of the display panel 30 and of the bezel 31 to conform to an uneven surface with peaks corresponding to the thickness of the bezel 31. In order to conform to the uneven surface with peaks corresponding to the thickness of the bezel 31, the optically clear adhesive sheet 10 is required to have flexibility and to be thicker than the bezel. Accordingly, the optically clear adhesive sheet used for bonding with the display panel 30 housed in the bezel 31 preferably has a thickness of 700 μm or more. The optically clear adhesive sheet of the present invention exhibits sufficient flexibility and optical characteristics (e.g., transparency) even in the case of having a thickness of 700 μm or more, and is therefore suited to bonding of the display panel 30 housed in the bezel to the touchscreen 32.

The display panel 30 can be of any type, such as a liquid crystal panel or an organic electroluminescent panel (organic EL panel).

The touchscreen 32 can be, for example, a resistive touchscreen or a capacitive touchscreen.

The optically clear adhesive sheet of the present invention employed in such a display device is less likely to decrease the adhesive strength under various conditions, and enables lasting, tight bonding of the optical members. As a result, no gap is formed between the optical members and the optically clear adhesive sheet, so that impairment of visibility due to factors such as an increase in the interfacial reflection can be prevented. Furthermore, the optically clear adhesive sheet, being less likely to cause whitening in high temperature and high humidity environments, can prevent reduction in visibility due to whitening. The optically clear adhesive sheet of the present invention can be suitably used in in-vehicle display devices such as display devices assembled into automotive navigation systems or in display devices for mobile devices such as smartphones, for example. In particular, the optically clear adhesive sheet of the present invention can ensure excellent adhesion and visibility in high temperature and high humidity environments and thus is suitable for display devices assembled into automotive navigation systems, which requires high reliability.

Any method for producing the optically clear adhesive sheet of the present invention may be employed, and examples thereof include a method including forming the first surface-adhesive layer 11, the second surface-adhesive layer 13, and the intermediate adhesive layer 12 separately and bonding these layers.

The first surface-adhesive layer 11 and the second surface-adhesive layer 13 may be produced by any method and may be produced, for example, from an acrylic resin composition or a urethane composition using a general film-forming machine (e.g., any of various coating machines, bar coaters, and doctor blades) or by a general film-forming treatment. Also, the intermediate adhesive layer 12 may be produced by centrifugal molding. When the first surface-adhesive layer 11 and the second surface-adhesive layer 13 contain cured thermosetting polyurethane, they may be produced by the same method as for the later-described method for producing the intermediate adhesive layer 12.

The intermediate adhesive layer 12 may be produced by any method such as a method in which a thermosetting polyurethane composition is prepared, and then the composition is molded while being heat-cured by a known method. The method preferably includes a step of preparing a thermosetting polyurethane composition by mixing a polyol component, a polyisocyanate component, and a tackifier with stirring, and a step of curing the thermosetting polyurethane composition.

The following is a specific example of the production method. First, a masterbatch is prepared by adding a given amount of a tackifier to a polyol component and dissolving the tackifier by stirring while heating. The obtained masterbatch, an additional polyol component, and a polyisocyanate component as well as other components such as a catalyst as necessary are mixed with stirring using a mixer, for example, so that a liquid or gel thermosetting polyurethane composition is obtained. The thermosetting polyurethane composition is immediately fed into a molding machine such that the thermosetting polyurethane composition is cured (crosslinked) while being transported in the state of being sandwiched between the first and second release liners. Thereby, the thermosetting polyurethane composition is semi-cured into a sheet integrated with the first and second release liners. The sheet is then crosslinked in a furnace for a given period of time, whereby an intermediate adhesive layer containing a cured product of the thermosetting polyurethane composition is obtained.

The method for producing the intermediate adhesive layer 12 may include, after preparation of an uncured thermosetting polyurethane composition, film formation using a general film-forming machine (e.g., any of various coating machines, bar coaters, and doctor blades) or by a film-forming treatment. The intermediate adhesive layer 12 may alternatively be produced by centrifugal molding.

EXAMPLES

The present invention is described in more detail below based on examples. The examples, however, are not intended to limit the scope of the present invention.

(Materials)

Materials used to prepare a thermosetting polyurethane composition in the following examples and comparative examples are listed below.

(A) Polyol Component

Polyolefin polyol ("EPOL®" available from Idemitsu Kosan Co., Ltd.)

(B) Polyisocyanate Component

Isocyanate A

Hexamethylene diisocyanate (HDI)-based polyisocyanate ("Coronate 4022" available from Tosoh Corporation)

Isocyanate B (B-1) HDI-based polyisocyanate ("Coronate 2760" available from Tosoh Corporation)

(B-2) Isophorone diisocyanate (IPDI)-based polyisocyanate ("Desmodur I" available from Sumika Bayer Urethane Co., Ltd.)

(B-3) HDI monomer ("HDI monomer" available from Tosoh Corporation)

(C) Tackifier

Hydrogenated petroleum resin-based tackifier ("Imarv P-100" available from Idemitsu Kosan Co., Ltd.)

(D) Catalyst

Dimethyltin dilaurate ("Fomrez catalyst UL-28" available from Momentive)

The "Coronate 4022" available from Tosoh Corporation is a product obtainable by reacting an ether polyol having three or more ethylene oxide units per molecule on average with polyisocyanate synthesized from starting materials of a hexamethylene diisocyanate and/or a hexamethylene diisocyanate monomer. The "Coronate 2760" available from Tosoh Corporation is a mixture of allophanate-modified hexamethylene diisocyanate and a hexamethylene diisocyanate trimer.

Production Example 1

First, a solid hydrogenated petroleum resin-based tackifier (Imarv P-100) was added to a polyolefin polyol (EPOL) whose temperature was controlled to 100° C. to 150° C., and the mixture was stirred so that a masterbatch containing the tackifier dissolved in the polyolefin polyol was obtained. Here, the tackifier content in the masterbatch was adjusted to 30 wt %. Next, in order that the resulting composition has an α ratio of 1.82, 100 parts by weight of the polyolefin polyol (EPOL), 11 parts by weight of the isocyanate A, the tackifier masterbatch, and 0.06 parts by weight of the catalyst (dimethyltin dilaurate) were mixed with stirring using an oscillating model agitator. Thereby, a thermosetting polyurethane composition was prepared. The amount of the tackifier masterbatch added was adjusted such that the tackifier content in the entire thermosetting polyurethane composition was 22.74 wt %.

The thermosetting polyurethane composition was crosslinked and cured in a furnace at a furnace temperature of 50° C. to 90° C. for several minutes while being transported in the state of being sandwiched between a pair of release liners (PET films with release-treated surfaces), and thereby a sheet with the release liners was obtained. The sheet was crosslinked in a heating machine for 10 to 15 hours, so that an adhesive sheet A having the release liner on each surface and containing a cured thermosetting polyurethane was produced. The adhesive sheet A had a thickness of 1500 μm.

Production Examples 2 to 16

Release-liner-including adhesive sheets B to P of Production Examples 2 to 16 were each produced in the same manner as in Production Example 1, except that the composition was changed as shown in the following Table 1. The adhesive sheets B to P each had a thickness of 1500 μm.

TABLE 1

| | Adhesive sheet | Polyol (part by weight) | Isocyanate A (part by weight) | Type of Isocyanate B | Isocyanate B (part by weight) | Tackifier (part by weight) | Catalyst (part by weight) | α ratio |
|---|---|---|---|---|---|---|---|---|
| Production Example 1 | A | 100 | 11 | — | 0 | 22.74 | 0.006 | 1.82 |
| Production Example 2 | B | 100 | 6.15 | B-1 | 5.77 | 22.93 | 0.006 | 1.70 |
| Production Example 3 | C | 100 | 5.81 | B-1 | 5.45 | 22.93 | 0.006 | 1.80 |
| Production Example 4 | D | 100 | 5.66 | B-1 | 5.3 | 22.93 | 0.006 | 1.85 |
| Production Example 5 | E | 100 | 6.32 | B-2 | 3.18 | 21.67 | 0.012 | 1.63 |
| Production Example 6 | F | 100 | 6.43 | B-2 | 3.24 | 21.67 | 0.012 | 1.60 |
| Production Example 7 | G | 100 | 0 | B-3 | 4.83 | 21.67 | 0.012 | 1.60 |
| Production Example 8 | H | 100 | 0 | B-3 | 5.15 | 21.67 | 0.012 | 1.50 |
| Production Example 9 | I | 100 | 4.44 | B-2 | 4.34 | 21.67 | 0.012 | 1.57 |
| Production Example 10 | J | 100 | 4.65 | B-2 | 4.54 | 21.67 | 0.012 | 1.50 |
| Production Example 11 | K | 100 | 3.74 | B-2 | 5.48 | 21.67 | 0.012 | 1.40 |
| Production Example 12 | L | 100 | 4.28 | B-2 | 4.18 | 9.83 | 0.011 | 1.63 |
| Production Example 13 | M | 100 | 4.44 | B-2 | 4.34 | 9.83 | 0.011 | 1.57 |
| Production Example 14 | N | 100 | 3.49 | B-2 | 5.11 | 0 | 0.01 | 1.50 |
| Production Example 15 | O | 100 | 3.68 | B-2 | 5.4 | 0 | 0.01 | 1.42 |
| Production Example 16 | P | 100 | 3.61 | B-2 | 5.29 | 0 | 0.01 | 1.45 |

In Table 1, the "α ratio" represents the number of moles of OH groups derived from polyol component/the number of moles of NCO groups derived from polyisocyanate component.

Production Example 17

An acrylic resin composition was prepared by adding 0.15 wt % an epoxy-based curing agent ("E-AX" available from Soken Chemical & Engineering Co., Ltd.) to an acrylic resin ("SK1838" available from Soken Chemical & Engineering Co., Ltd.), relative to the entire acrylic resin composition. The acrylic resin composition was then applied to a release liner using a comma coater and was dried in a drying furnace at 80° C. to 120° C. Then, the surface with the acrylic adhesive was attached to another release liner. The workpiece was heated at 40° C. for one week to be cured, whereby a 100-μm-thick adhesive sheet was produced. Fifteen adhesive sheets prepared the same as in the above were stacked to be formed into an adhesive sheet Q having a thickness of 1500 μm.

Production Examples 18 and 19

Adhesive sheets R and S of Production Examples 18 and 19 were each produced in the same manner as in Production Example 17 except that the amount of the curing agent was changed to 0.25 wt % and 0.35 wt %, respectively. The adhesive sheets R and S each had a thickness of 1500 μm.

(Evaluation of Adhesive Sheet)

The adhesive sheets produced in Production Examples 1 to 19 were subjected to measurement of (1) storage elastic modulus and loss tangent by the following method. Then, in order to evaluate the durability for the adhesive sheets in a high temperature and high humidity environment, (2) delay bubble check, (3) heat cycle test, and (4) whitening check were conducted. The cases evaluated as poor in any of the above (2) to (4) were comprehensively evaluated as poor. Table 2 shows the results.

(1) Measurement of Storage Elastic Modulus (G') and Loss Tangent (Tan δ)

The storage elastic modulus and the loss tangent of each adhesive sheet was measured using a viscoelasticity measuring device "Physica MCR301" available from Anton Paar Germany GmbH. The measuring plate used was PP12, and the measuring conditions were a strain of 0.1%, a frequency of 1 Hz, and a cell temperature of 25° C. to 100° C. (temperature rise rate: 3° C./min). The following Table 2 shows the measured values of the storage elastic modulus and loss tangent at 30° C. and 85° C.

(2) Delay Bubble Check

Each adhesive sheet from which both release liners were peeled off was sandwiched by a glass plate and a plastic plate, whereby a sample of a laminate including the glass plate, the adhesive sheet, and the plastic plate in the stated order was produced. The glass plate used above was a 1.3-mm-thick soda-lime glass plate available from Matsunami Glass Ind., Ltd. The plastic plate used above was a laminate sheet (thickness: 1 mm) including a polycarbonate layer and an acryl layer, available from Meihan Shinku Kogyo Co., Ltd. Each side of the laminate sheet was treated with an acrylic primer. The polycarbonate side of the laminate sheet was bonded to the adhesive sheet. Each resulting sample was left to stand in a high temperature and high humidity environment (85° C., 85%) for 1000 hours. Then, the bonded interface was visually observed for checking the presence of air bubbles. The cases without air bubbles were evaluated as good, and the cases with air bubbles were evaluated as poor.

(3) Heat Cycle Test

Each sample laminate sequentially including a glass plate, an adhesive sheet, and a plastic plate was produced in the same manner as in the above (2) delay bubble check. Each sample was subjected to a heat cycle test using a heat shock test device (ES-56L) available from Hitachi, Ltd. In one cycle of the heat cycle test, the sample was left in the device for 30 minutes at −40° C. and then for 30 minutes at 85° C. Each sample was subjected to 1000 cycles. The cases in which the sample had no peeling in all the surfaces and edges were evaluated as good, and the cases in which the sample had peeling at least at an edge was evaluated as poor.

(4) Whitening Check

One of the release liners of each release-liner-including adhesive sheet was peeled off, and the exposed adhesive sheet of the sample was bonded to a microscope slide (made of soda-lime glass). The members were retained in this state under a pressure of 0.4 MPa for 30 minutes, so that the adhesive sheet and the microscope slide were bonded to each other. The other release liner on the side opposite to the microscope slide was then peeled off. The resulting sample was left to stand in a high temperature and high humidity environment (temperature: 85° C., humidity: 85%) for 168 hours. Thereafter, the adhesive sheet was visually observed. The cases with no whitening were evaluated as good. The cases with whitening were evaluated as poor.

TABLE 2

| | Adhesive sheet | Storage elastic modulus (×10⁴ Pa) | | Loss tangent | | Durability (high temperature, high humidity) | | | Comprehensive evaluation |
|---|---|---|---|---|---|---|---|---|---|
| | | G' (30° C.) | G' (85° C.) | tan δ (30° C.) | tan δ (85° C.) | Delay bubbles | Heat cycle test | Whitening | |
| Production Example 1 | A | 9.33 | 1.58 | 0.75 | 0.55 | Poor | Good | Good | Poor |
| Production Example 2 | B | 13.49 | 2.69 | 0.65 | 0.49 | Good | Poor | Good | Poor |
| Production Example 3 | C | 8.91 | 1.10 | 0.81 | 0.78 | Poor | Good | Good | Poor |
| Production Example 4 | D | 7.94 | 0.81 | 0.87 | 0.91 | Poor | Poor | Good | Poor |
| Production Example 5 | E | 11.80 | 1.99 | 0.71 | 0.62 | Poor | Good | Good | Poor |
| Production Example 6 | F | 12.2 | 2.39 | 0.71 | 0.55 | Poor | Good | Good | Poor |
| Production Example 7 | G | 26.00 | 10.00 | 0.41 | 0.27 | Good | Poor | Good | Poor |
| Production Example 8 | H | 21.30 | 12.40 | 0.28 | 0.14 | Good | Poor | Good | Poor |
| Production Example 9 | I | 17.50 | 3.05 | 0.62 | 0.54 | Good | Poor | Good | Poor |
| Production Example 10 | J | 15.80 | 3.81 | 0.54 | 0.40 | Good | Poor | Good | Poor |
| Production Example 11 | K | 16.60 | 3.55 | 0.60 | 0.50 | Good | Poor | Good | Poor |
| Production Example 12 | L | 16.30 | 3.68 | 0.60 | 0.48 | Good | Poor | Good | Poor |
| Production Example 13 | M | 19.80 | 5.42 | 0.52 | 0.38 | Good | Poor | Good | Poor |

TABLE 2-continued

| | Adhesive sheet | Storage elastic modulus ($\times 10^4$ Pa) | | Loss tangent | | Durability (high temperature, high humidity) | | | Comprehensive evaluation |
|---|---|---|---|---|---|---|---|---|---|
| | | G' (30° C.) | G' (85° C.) | tan δ (30° C.) | tan δ (85° C.) | Delay bubbles | Heat cycle test | Whitening | |
| Production Example 14 | N | 2.29 | 7.82 | 0.49 | 0.35 | Good | Poor | Good | Poor |
| Production Example 15 | O | 32.70 | 13.70 | 0.39 | 0.24 | Good | Poor | Good | Poor |
| Production Example 16 | P | 34.60 | 15.70 | 0.38 | 0.23 | Good | Good | Poor | Poor |
| Production Example 17 | Q | 15.8 | 8.32 | 0.52 | 0.25 | Good | Good | Poor | Poor |
| Production Example 18 | R | 35.5 | 28.18 | 0.36 | 0.12 | Good | Good | Poor | Poor |
| Production Example 19 | S | 79.4 | 50.12 | 0.22 | 0.10 | Good | Good | Poor | Poor |

As shown in Table 2, no single-layer adhesive sheets could get good results in all the evaluation criteria, i.e., (2) delay bubble check, (3) heat cycle test, and (4) whitening check.

Example 1

In Example 1, a release-liner-including optically clear adhesive sheet was produced such that the release-liner-including adhesive sheets I produced in Production Example 9 were used as a first surface-adhesive layer and a second surface-adhesive layer, and the release-liner-including adhesive sheet C produced in Production Example 3 was used as an intermediate adhesive layer.

First, two release-liner-including adhesive sheets I produced in Production Example 9 and one release-liner-including adhesive sheet C produced in Production Example 3 were prepared. One of the release liners was peeled from a first release-liner-including adhesive sheet I, and the exposed surface of the first adhesive sheet I was attached to the adhesive sheet C. Then, one of the release liners was peeled from a second release-liner-including adhesive sheet I, and the resulting second adhesive sheet I was stacked on the adhesive sheet C on the side opposite to the first adhesive sheet I. Thereby, a laminate sequentially including a release liner, an adhesive sheet I, an adhesive sheet C, an adhesive sheet I, and a release liner (release-liner-including optically clear adhesive sheet) was obtained.

Examples 2 to 5 and Comparative Examples 1 to 5

Release-liner-including optically clear adhesive sheets of Examples 2 to 5 and Comparative Examples 1 to 5 were produced in the same manner as in Example 1, except that the adhesive sheets used for the first surface-adhesive layer, the intermediate adhesive layer, and the second surface-adhesive layer and the thicknesses of the layers were changed according to Table 3.

TABLE 3

| | | Adhesive sheet | Thickness (mm) | storage elastic modulus ($\times 10^4$ Pa) | | Loss tangent | |
|---|---|---|---|---|---|---|---|
| | | | | G' (30° C.) | G' (85° C.) | tan δ (30° C.) | tan δ (85° C.) |
| Example 1 | First surface-adhesive layer | I | 200 | 17.5 | 3.1 | 0.62 | 0.54 |
| | Intermediate adhesive layer | C | 2000 | 8.9 | 1.1 | 0.81 | 0.78 |
| | Second surface-adhesive layer | I | 500 | 17.5 | 3.1 | 0.62 | 0.54 |
| Example 2 | First surface-adhesive layer | R | 10 | 35.5 | 28.2 | 0.36 | 0.12 |
| | Intermediate adhesive layer | O | 2000 | 32.7 | 13.7 | 0.39 | 0.24 |
| | Second surface-adhesive layer | R | 50 | 35.5 | 28.2 | 0.36 | 0.12 |
| Example 3 | First surface-adhesive layer | Q | 10 | 15.8 | 8.3 | 0.52 | 0.25 |
| | Intermediate adhesive layer | K | 500 | 16.6 | 3.5 | 0.60 | 0.50 |
| | Second surface-adhesive layer | Q | 100 | 15.8 | 8.3 | 0.52 | 0.25 |
| Example 4 | First surface-adhesive layer | Q | 20 | 15.8 | 8.3 | 0.52 | 0.25 |
| | Intermediate adhesive layer | E | 100 | 11.8 | 2.0 | 0.71 | 0.62 |
| | Secondsurface-adhesive layer | R | 10 | 35.5 | 28.2 | 0.36 | 0.12 |
| Example 5 | First surface-adhesive layer | I | 100 | 17.5 | 3.1 | 0.62 | 0.54 |
| | Intermediate adhesive layer | F | 1300 | 12.2 | 2.4 | 0.71 | 0.55 |
| | Second surface-adhesive layer | I | 100 | 17.5 | 3.1 | 0.62 | 0.54 |
| Comparative Example 1 | First surface-adhesive layer | A | 300 | 9.3 | 1.6 | 0.75 | 0.55 |
| | Intermediate adhesive layer | D | 1000 | 7.9 | 0.8 | 0.87 | 0.91 |
| | Second surface-adhesive layer | B | 300 | 13.5 | 2.7 | 0.65 | 0.49 |
| Comparative Example 2 | First surface-adhesive layer | D | 300 | 7.9 | 0.8 | 0.87 | 0.91 |
| | Intermediate adhesive layer | O | 2000 | 32.7 | 13.7 | 0.39 | 0.24 |
| | Second surface-adhesive layer | D | 300 | 7.9 | 0.8 | 0.87 | 0.91 |
| Comparative Example 3 | First surface-adhesive layer | S | 20 | 79.4 | 50.1 | 0.22 | 0.10 |
| | Intermediate adhesive layer | M | 1000 | 19.8 | 5.4 | 0.52 | 0.38 |
| | Second surface-adhesive layer | S | 300 | 79.4 | 50.1 | 0.22 | 0.10 |
| Comparative Example 4 | First surface-adhesive layer | R | 20 | 35.5 | 28.2 | 0.36 | 0.12 |
| | Intermediate adhesive layer | P | 100 | 34.6 | 15.7 | 0.38 | 0.23 |
| | Second surface-adhesive layer | R | 20 | 35.5 | 28.2 | 0.36 | 0.12 |

TABLE 3-continued

|  |  | Adhesive sheet | Thickness (mm) | storage elastic modulus (×10⁴ Pa) | | Loss tangent | |
| --- | --- | --- | --- | --- | --- | --- | --- |
|  |  |  |  | G' (30° C.) | G' (85° C.) | tan δ (30° C.) | tan δ (85° C.) |
| Comparative Example 5 | First surface-adhesive layer | I | 100 | 17.5 | 3.1 | 0.62 | 0.54 |
|  | Intermediate adhesive layer | D | 1000 | 7.9 | 0.8 | 0.87 | 0.91 |
|  | Second surface-adhesive layer | I | 100 | 17.5 | 3.1 | 0.62 | 0.54 |

(Evaluation of optically clear adhesive sheet)

By the same process and the same evaluation criteria as in the "evaluation of adhesive sheet", (2) delay bubble check, (3) heat cycle test, and (4) whitening check were conducted for the optically clear adhesive sheets produced in Examples 1 to 5 and Comparative Examples 1 to 5. Table 4 shows the results.

TABLE 4

|  | Delay bubbles (high temperature, high humidity) | Heat cycle test (−40° C. to 85° C.) | Whitening (high temperature, high humidity) |
| --- | --- | --- | --- |
| Example 1 | Good | Good | Good |
| Example 2 | Good | Good | Good |
| Example 3 | Good | Good | Good |
| Example 4 | Good | Good | Good |
| Example 5 | Good | Good | Good |
| Comparative Example 1 | Poor | Poor | Good |
| Comparative Example 2 | Poor | Poor | Good |
| Comparative Example 3 | Good | Poor | Good |
| Comparative Example 4 | Good | Good | Poor |
| Comparative Example 5 | Good | Poor | Good |

As shown in Table 4, the optically clear adhesive sheets of Examples 1 to 5 achieved "good" in all of the (2) delay bubble check, (3) heat cycle test, and (4) whitening check. The adhesive sheets used for the first surface-adhesive layer, the intermediate adhesive layer, and the second surface-adhesive layer of Examples 1 to 5 were each comprehensively evaluated as "poor" when having a single-layer structure. This demonstrates that when an adhesive sheet having a storage elastic modulus at 85° C. within a prescribed range is used as an intermediate adhesive layer and adhesive sheets each having a higher storage elastic modulus at 85° C. than the intermediate adhesive layer are used as the first and second surface-adhesive layers, the resulting optically clear adhesive sheet can achieve sufficient durability in high temperature and high humidity environments.

In Comparative Example 1 and Comparative Example 2, the first and second surface-adhesive layers each had a low $G'_{85°\,C.}$, and therefore presumably failed to sufficiently prevent inner foaming of the intermediate adhesive layer. In Comparative Example 3, the first and second surface-adhesive layers were too rigid, and therefore presumably had insufficient adhesiveness to a glass surface and to a PET film, resulting in peeling in the heat cycle test. In Comparative Example 4, the adhesive sheet R used for the first and second surface-adhesive layers was thin and thus no whitening was observed. In contrast, the adhesive sheet P used for the intermediate adhesive layer was thick and whitening was therefore presumably observed. In Comparative Example 5, the intermediate adhesive layer had a $G'_{85°\,C.}$ of less than $1.0\times10^4$ Pa. Thus, a large amount of inner foaming was generated in the intermediate adhesive layer, resulting in peeling in the heat cycle test. In Comparative Example 1 and Comparative Example 5, in which an intermediate adhesive layer having a $G'_{85°\,C.}$ of less than $1.0\times10^4$ Pa was used, the intermediate adhesive layer was too soft. This tends to cause trouble when the resulting OCA sheet is cut into a prescribed size.

REFERENCE SIGNS LIST

9: Adhesive sheet
10: Optically clear adhesive sheet
11: First surface-adhesive layer
12: Intermediate adhesive layer
13: Second surface-adhesive layer
20: Laminate
21: First release liner
22: Second release liner
30: Display panel
31: Bezel
32: Touchscreen
33: Transparent cover panel
41: Microscope slide
42: PET sheet
100: Display device

What is claimed is:

1. An optically clear adhesive sheet sequentially comprising:
    a first surface-adhesive layer;
    an intermediate adhesive layer; and
    a second surface-adhesive layer,
    the first surface-adhesive layer and the second surface-adhesive layer each having a higher storage elastic modulus at 85° C. than the intermediate adhesive layer,
    the first surface-adhesive layer and the second surface-adhesive layer each having a storage elastic modulus at 85° C. of $3.0\times10^4$ Pa or higher and $30.0\times10^4$ Pa or lower,
    the intermediate adhesive layer having a storage elastic modulus at 85° C. of $1.0\times10^4$ Pa or higher and $15.0\times10^4$ Pa or lower,
    the intermediate adhesive layer containing polyurethane, and
    the first surface-adhesive layer and the second surface-adhesive layer each containing polyurethane or acrylic resin.

2. The optically clear adhesive sheet according to claim 1, wherein the first surface-adhesive layer and the second surface-adhesive layer each have a higher storage elastic modulus at 30° C. than the intermediate adhesive layer.

3. The optically clear adhesive sheet according to claim 1, wherein the first surface-adhesive layer and the second surface-adhesive layer each have a lower loss tangent at 30° C. than the intermediate adhesive layer.

4. The optically clear adhesive sheet according to claim 1, wherein the first surface-adhesive layer and the second surface-adhesive layer each have a lower loss tangent at 85° C. than the intermediate adhesive layer.

5. The optically clear adhesive sheet according to claim 1, wherein the first surface-adhesive layer and the second surface-adhesive layer each have a loss tangent at 85° C. of 0.54 or lower.

6. The optically clear adhesive sheet according to claim 1, wherein the intermediate adhesive layer has a greater thickness than each of the first surface-adhesive layer and the second surface-adhesive layer.

7. The optically clear adhesive sheet according to claim 1, wherein the polyurethane is a cured thermosetting polyurethane.

8. A laminate comprising:
the optically clear adhesive sheet according to claim 1;
a first release liner covering one surface of the optically clear adhesive sheet; and
a second release liner covering the other surface of the optically clear adhesive sheet.

9. A bonded structure comprising:
a first adherend including a glass substrate;
a second adherend including a resin substrate; and
the optically clear adhesive sheet according to claim 1 bonding the glass substrate and the resin substrate.

10. The optically clear adhesive sheet according to claim 2, wherein the first surface-adhesive layer and the second surface-adhesive layer each have a lower loss tangent at 30° C. than the intermediate adhesive layer.

11. The optically clear adhesive sheet according to claim 2, wherein the first surface-adhesive layer and the second surface-adhesive layer each have a lower loss tangent at 85° C. than the intermediate adhesive layer.

12. The optically clear adhesive sheet according to claim 3, wherein the first surface-adhesive layer and the second surface-adhesive layer each have a lower loss tangent at 85° C. than the intermediate adhesive layer.

13. The optically clear adhesive sheet according to claim 2, wherein the first surface-adhesive layer and the second surface-adhesive layer each have a loss tangent at 85° C. of 0.54 or lower.

14. The optically clear adhesive sheet according to claim 3, wherein the first surface-adhesive layer and the second surface-adhesive layer each have a loss tangent at 85° C. of 0.54 or lower.

15. The optically clear adhesive sheet according to claim 4, wherein the first surface-adhesive layer and the second surface-adhesive layer each have a loss tangent at 85° C. of 0.54 or lower.

16. The optically clear adhesive sheet according to claim 2, wherein the intermediate adhesive layer has a greater thickness than each of the first surface-adhesive layer and the second surface-adhesive layer.

17. The optically clear adhesive sheet according to claim 3, wherein the intermediate adhesive layer has a greater thickness than each of the first surface-adhesive layer and the second surface-adhesive layer.

18. The optically clear adhesive sheet according to claim 4, wherein the intermediate adhesive layer has a greater thickness than each of the first surface-adhesive layer and the second surface-adhesive layer.

19. The optically clear adhesive sheet according to claim 5, wherein the intermediate adhesive layer has a greater thickness than each of the first surface-adhesive layer and the second surface-adhesive layer.

* * * * *